United States Patent

Shamay

[15] 3,647,465
[45] Mar. 7, 1972

[54] PHOTOGRAPHIC FILM ROLL

[72] Inventor: Menashe Shamay, 130 Hanassi Ave., Haifa, Israel

[22] Filed: Aug. 22, 1969

[21] Appl. No.: 852,218

[52] U.S. Cl. .................................................... 96/78
[51] Int. Cl. .................................................... G03c 3/02
[58] Field of Search .................................................... 96/78

[56] References Cited

UNITED STATES PATENTS

| | | | |
|---|---|---|---|
| 1,454,815 | 5/1923 | Jones | 96/78 |
| 1,454,818 | 5/1923 | Jones | 96/78 |
| 1,826,695 | 10/1931 | Favour | 96/78 |
| 3,086,862 | 4/1963 | Eagle et al. | 96/78 |

Primary Examiner—David Klein
Attorney—Benjamin J. Barish

[57] ABSTRACT

A photographic film roll including a filmstrip wound on a film spool comprises two masking strips of an opaque plastic material one covering the beginning end of the filmstrip and the other covering the completed end. The outer end of the one masking strip and the inner end of the other masking strip are each attached to the nonemulsion side of the filmstrip. Each masking strip is wound with, and overlies the nonemulsion side of, its respective end of the filmstrip for at least several windings of the filmstrip when wound on the spool. The masking strips are slightly wider than the filmstrip so as to project slightly beyond its edges while covering the sprocket holes, and are made of thin, flexible plastic material such that the camera feeding sprockets passing through the sprocket holes of the filmstrip will emboss the masking strips but will not puncture them.

8 Claims, 6 Drawing Figures

PATENTED MAR 7 1972 3,647,465
FIG. 1 FIG. 2 FIG. 3
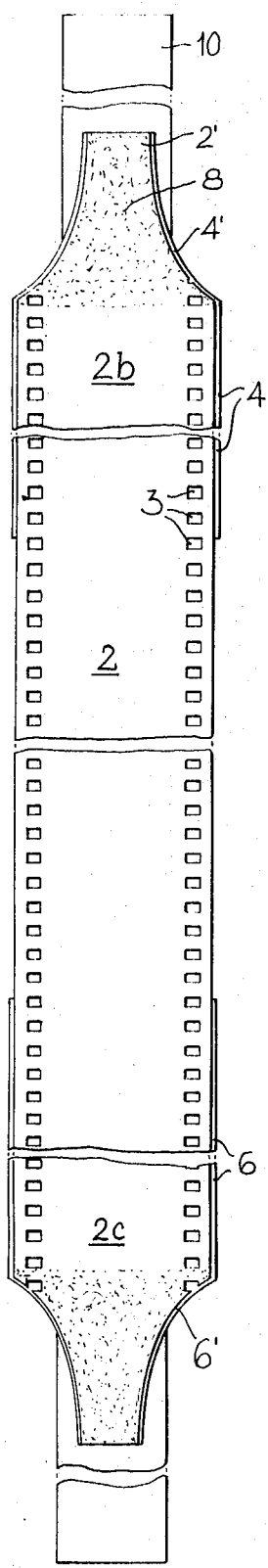
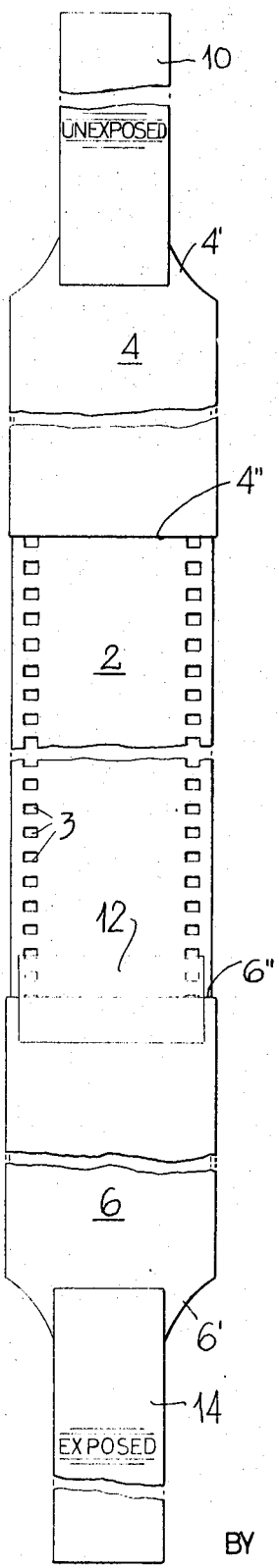
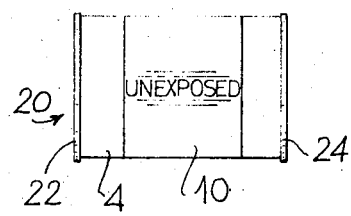
FIG. 4
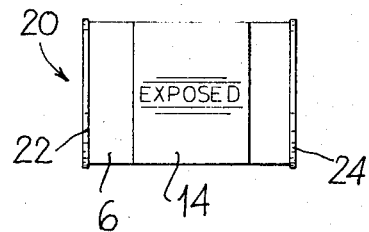
FIG. 5
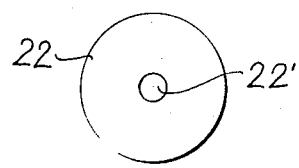
FIG. 6
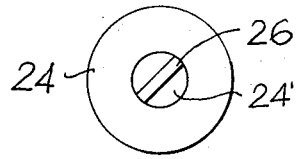
INVENTOR
MENASHE SHAMAY
BY
ATTORNEY

PHOTOGRAPHIC FILM ROLL

BACKGROUND OF THE INVENTION

1. Field of the Invention

The invention relates to photographic film rolls which include a filmstrip wound on a film spool, the filmstrip having sprocket holes along its opposite edges for engagement by the feeding sprockets of the camera. The invention is herein described with respect to 35 mm. film, but may be used with film rolls of other sizes.

2. Description of the Prior Art

Photographic film rolls of the type hereinabove referred to are commonly supplied in cassettes so as to protect the film from exposure to light. After the film roll has been completely exposed in the camera, it must be rewound back into the original cassette in order to protect the exposed film from light when it is removed from the camera. This arrangement, among other drawbacks: is costly, because of the need for the cassettes and for the rewinding mechanism in the camera; is inconvenient to the user, as it requires him to rewind the exposed film back into the cassette; and increases the possibility of breaking or scratching the film at the time it is rewound back into the cassette.

BRIEF DESCRIPTION OF THE PRESENT INVENTION

The present invention provides a photographic film roll having advantages in the above respects.

Briefly, the photographic film roll of the present invention includes two masking strips of an opaque plastic material, one covering the beginning end of the filmstrip, and the other covering the completed end of the filmstrip. The outer end of one masking strip and the inner end of the other masking strip are each attached to the nonemulsion side of the filmstrip at their respective ends. Each of the masking strips is wound with, and overlies the nonemulsion side of, its respective end of the film strip for at least several windings of the filmstrip on the film spool. Further, each of the masking strips is slightly wider than the filmstrip so as to project slightly beyond the opposite edges thereof while covering the sprocket holes of the filmstrip, and each masking strip is made of thin, flexible plastic material such that the camera feeding sprockets passing through the sprocket holes of the film strip will emboss the masking strips but will not puncture them.

A photographic film roll so constructed is completely shielded from the light by the masking strips when the film roll is both in its "unexposed" and "exposed" condition. It may thus be simply loaded into the camera, exposed for its complete length, and then removed from the camera, without the need for rewinding the film back onto the original film spool. The photographic roll thus obviates the need for cassettes or the rewinding mechanism in the camera. Its use, therefore, enables a substantial savings in cost, both of the film roll and of the camera, is faster and more convenient, and decreases the possibility of film breakage or scratching that may occur during the rewinding step in the presently used photographic roll.

According to further important features of the invention, the inner end of the one (i.e., the beginning-end) masking strip is unattached to the filmstrip; and the outer end of the other (i.e., the completed-end) masking strip is attached to the filmstrip.

Further features and advantages of the invention will be apparent from the description below.

BRIEF DESCRIPTIONS OF THE DRAWINGS

The invention is herein described, by way of example only, with reference to the accompanying drawings, wherein:

FIG. 1 illustrates the emulsion side of a photographic film roll, in flat form, constructed in accordance with the invention;

FIG. 2 illustrates the nonemulsion side of the film of FIG. 1;

FIG. 3 illustrates the photographic film roll of FIG. 1 in its "unexposed" condition wound on a film spool;

FIG. 4 illustrates the photographic film roll in its "exposed" condition wound on the film spool;

FIG. 5 illustrates one end of the film spool, and

FIG. 6 illustrates the opposite end of the film spool

DESCRIPTION OF THE PREFERRED EMBODIMENT

The photographic film roll illustrated in the drawings comprises a filmstrip 2, the beginning end of which is indicated at 2b, and the completed end of which is indicated at 2c. The filmstrip is formed with sprocket holes 3 along its opposite edges for engagement by the feeding sprockets of the camera. As one example, the film may be standard 35 mm. width film having a length of 174 cm. Covering the beginning-end 2b of the filmstrip is a masking strip 4, and covering the completed-end 2c of the filmstrip is a second masking strip 6. Both masking strips 4 and 6 are slightly wider than the film strip 2 so as to project slightly beyond the opposite edges of the film strip while covering the sprocket holes 3. For example, the two masking strips are preferably 36.2 mm. in width, whereby each projects 0.6 mm. beyond each of the two edges of the filmstrip.

The two masking strips are made of an opaque, thin, flexible plastic material such that the camera feeding sprockets passing through the sprocket holes 3 of the film strip will emboss the masking strips but will not puncture them. Thus, the masking strips will permit the camera sprockets to feed the filmstrip in the usual manner, but will not be punctured by the camera sprockets so that they will retain their masking functions even after having been fed by the camera sprockets. Suitable plastic films that may be used are polyethylene, "Mylar" or other films commonly available today. Preferably, the masking strips are of semimatte, opaque, plastic film 0.10 mm. in thickness.

The outer end of masking strip 4 is cut so as to have a tail 4' of reduced width, conforming to the usual reduced-width tail 2' provided on the film strips. Tail 4' portion of the masking strip is attached to the beginning end of the nonemulsion side of the film by any suitable adhesive, as indicated at 8. In addition, a paper wrapper strip 10 is attached to the tail 4' of masking strip 4. Wrapper strip 10 carries the legend "UNEXPOSED," which legend is displayed when the film roll is wound on the spool in its original "unexposed" condition, as shown in FIG. 3.

The inner end 4'' (i.e., the end opposite to tail 4') of masking strip 4 is preferably unattached to the filmstrip so that end is free to move along the nonemulsion side of the filmstrip when the film roll is wound on the film spool. If it is desired to have the inner end of masking strip attached to the filmstrip, it would be necessary to make the masking strip slightly longer than the covered portion of the filmstrip because the masking strip assumes a slightly increased diameter than the filmstrip when wound with it on the film spool.

Masking strip 4 is of sufficient length so that it may be wound with, while overlying the nonemulsion side of, the beginning-end 2b of the film strip 2 for at least several windings of the filmstrip on the spool. I have found that particularly good results are provided when the masking strip 4 is 42 cm. in length.

The second masking strip 6 attached at the completed-end 2c of filmstrip 2 is the same as masking strip 4 in material, width, and end configuration, being formed with the end tail 6' of reduced width. The inner end 6'' (i.e., that opposite to tail 6') of masking strip 6, however, is attached to the filmstrip on the nonemulsion side of the latter. An adhesive could be used for this purpose, but preferably the attachment is made by a pressure-sensitive tape 12 which can be easily stripped off with the masking strip 6 from filmstrip 2 at the time the film is ready for developing. As an example, pressure-sensitive tape 12 may be 0.05 mm. in thickness, 18 mm. in length, and 33 mm. in width. The commonly available adhesive tape sold under the trademark "Scotch" has been found very satisfactory as it leaves no adhesive on the film when the tape is stripped off.

While the outer end (6') of masking strip 6 may be unattached to the filmstrip, it is preferable to attach it. In that case, the length of the masking strip should be slightly longer than the covered portion of the filmstrip because of the increase in roll diameter assumed by the masking strip when wound with the filmstrip on the spool. As in the case of masking strip 4, masking strip 6 should also be of a length so as to be wound with the filmstrip for at least several windings of the latter on the spool. As one preferred example, masking strip 6 may be 26 cm. in length, and may be attached to the filmstrip so as to cover 25.2 cm. of the latter.

A wrapper strip 14 is also applied to the outer end of masking strip 6, this wrapper strip carrying the legend "EXPOSED," which legend is displayed when the exposed film is wound on the spool, as shown in FIG. 4.

In the film spool, designated 20 in FIGS. 3 and 4, the end plates 22 and 24 are spaced from each other slightly more than the width of the filmstrip 2 but slightly less than the width of the masking strips 4 and 6. As one preferred example, the spacing between end plates 22 and 24 of the spool may be 36 mm. so that the masking strips, both of 36.2 mm. width, will engage the two plates and will thus provide a light seal when the film is wound on the spool.

It will be understood that the supply and takeup film spools should be interchangeable. Also, the takeup spool should be turnable only counterclockwise in the camera.

It will be appreciated that masking strip 4 will prevent the ingress of light while the film is wound on the spool in its "unexposed" condition, and masking strip 6 will prevent the ingress of light when the film is wound on the spool in its "exposed" condition. At the same time, the masking strips will not interfere with the feedings of the filmstrip by the camera sprockets. Thus the use of this photographic film roll obviates the need for cassettes, for rewinding the filmstrip after exposure, and also for the rewinding mechanism normally included in the camera.

The end walls 22 and 24 of the film spool are formed with mounting openings 22' and 24' respectively. Opening 22' includes a cross-bar 26 for engagement with the driving spindle of the camera. The two openings are of different sizes to preclude reloading an already exposed film.

It will be appreciated the invention could also be used with different size film, e.g., movie film.

Many variations, modifications and other applications of the illustrated embodiments will be apparent.

What is claimed is:

1. Photographic film roll including a filmstrip wound on a film spool, the film spool having end walls spaced apart a distance slightly greater than the width of the filmstrip, the filmstrip having an emulsion side and a nonemulsion side and further having sprocket holes along its opposite edges for engagement by the feeding sprockets of the camera, characterized in that the film roll includes two masking strips of an opaque material, one covering the beginning-end of the filmstrip, and the other covering the completed-end of the filmstrip; the outer end of said one masking strip and the inner end of said other masking strip each being attached to the nonemulsion side of the filmstrip at their respective ends; each of said masking strips being wound with, and overlying the nonemulsion side of its respective end of the filmstrip for at least several windings of the filmstrip on the film spool; said masking strips being slightly wider than the filmstrip and the spacing between the end walls of the film spool so as to project slightly beyond the opposite edges of the filmstrip while covering the sprocket holes and providing a light seal with the spool end walls, said masking strips being made of thin, flexible plastic material such that the camera feeding sprockets passing through the sprocket holes of the film will emboss the masking strips but will not puncture same.

2. A photographic film roll as defined in claim 1, wherein the inner end of said one masking strip is unattached to the filmstrip.

3. A photographic film roll as defined in claim 2, wherein the outer end of said other masking strip is attached to the filmstrip.

4. A photographic film roll as defined in claim 3, wherein the outer ends of the two masking strips are each attached to the filmstrip by an adhesive, and the inner end of said other masking strip is attached to the filmstrip by a pressure-sensitive adhesive tape.

5. A photographic film roll as defined in claim 1, wherein said filmstrip is 35 mm. in width, and said masking strips are each 36.2 mm. in width.

6. A photographic film roll as defined in claim 5, wherein the end walls of said film spool are spaced 36 mm. apart.

7. A photographic film roll as defined in claim 1, wherein said filmstrip is 174 cm. in length, said one masking strip is 42 cm. in length, and said other masking strip is 26 cm. in length.

8. A photographic film roll as defined in claim 1, wherein said masking strips are each of semimatte, opaque, plastic film 0.10 mm. in thickness.

* * * * *